Patented Dec. 31, 1940

2,226,645

UNITED STATES PATENT OFFICE 2,226,645

MANUFACTURE OF METHACRYLIC ACID AND ESTERS THEREOF

Edward Boaden Thomas and Horace Finningley Oxley, Spondon, near Derby, England, assignors to Celanese Corporation of America, a corporation of Delaware No Drawing. Application October 11, 1938, Serial No. 234,356. In Great Britain November 4, 1937

12 Claims. (Cl. 260—486)

This invention relates to the manufacture of methacrylic acid and esters thereof.

According to the invention esters of methacrylic acid are made by treating a mixture of chloretone and the alcohol whose ester is desired with an acid or a caustic alkali or other base. If methacrylic acid itself is desired water should also be present. Sulphuric acid is a valuable agent for aiding the conversion, but other strong acids or acids having dehydrating properties, e. g. phosphoric acid, may be used.

The reaction may be carried out in a single stage, or in two stages. When working in a single stage the chloretone is subjected to a fairly prolonged treatment with the acid or alkali, preferably at an elevated temperature. For example the chloretone may be mixed with about 2-8 or more molecular proportions of methanol, ethanol or other alcohol and between 1 and 4 molecular proportions of concentrated sulphuric acid or of a concentrated solution of potassium hydroxide; the temperature employed for the reaction is preferably above 50° C., for example 80° or 100° C. or higher, pressure being employed if necessary to keep the materials in the liquid phase. When employing a lower fatty alcohol the reagents may with advantage be heated under reflux at atmospheric pressure.

When the reaction is carried out in two stages, either an α-chlorisobutyric ester or an α-hydroxyisobutyric ester may be isolated (not necessarily in a pure form) as an intermediate. To this end it is desirable to employ less severe conditions than are required when the process is carried through in a single stage. For example lower temperatures may be used and/or the reaction may be stopped as soon as it has produced a good yield of the intermediate product. For example the chloretone and alcohol may be heated under reflux for a shorter time than is required to carry the reaction right through to the production of a methacrylate. On the other hand, the same result may be secured by employing a less concentrated acid or alkali.

The α-chlor- or α-hydroxyisobutyric ester so produced, preferably after removal of excess alcohol, for instance by distillation under atmospheric or reduced pressure, may then be converted into the corresponding ester of methacrylic acid by treatment with sulphuric acid or other strong acid or dehydrating acid or a caustic alkali or other base. Sulphuric acid may be used with advantage in the conversion of α-hydroxyisobutyric esters, and caustic alkali or other bases, for example dialkyl anilines, pyridine or quinoline, in the conversion of α-chlorisobutyric esters, but either class of reagent may be used with the other starting material. This stage also may be carried out at elevated temperatures, for example temperatures between 50° C. and 150° C.

As already indicated, the new process may also be used to produce methacrylic acid by employing a dilute aqueous alcohol or adding a large amount of water to the reagents or the sulphuric or other acid or alkali; advantageously the water may be added towards the end of the reaction. In general the reaction when water is present or to be added may be carried out under substantially the same conditions as when a more or less anhydrous alcohol and concentrated sulphuric acid or alkali are employed.

The process of the invention has a further advantage in that it makes possible the synthesis of methacrylic acid or esters thereof from the relatively cheap raw materials acetone and chloroform. Thus the chloretone may be made by the addition of chloroform to acetone in the presence of solid caustic alkali, the alkali preferably being brought into contact with the acetone and chloroform little by little. The acetone is best employed in substantial excess. This operation may be combined with those set out above to provide a unitary process for synthesising methacrylic acid or esters from chloroform, acetone and an alcohol. Thus, powdered caustic alkali may be added gradually to a mixture of acetone and chloroform, or the acetone and the chloroform may be added gradually to the caustic alkali, or the chloroform may be added slowly to the caustic alkali and acetone, or the acetone to the caustic alkali and chloroform. During the synthesis of the chloretone it is advisable to keep the reagents relatively cool and if necessary special cooling means may be provided. When the mixture of the reagents is complete and the formation of chloretone has virtually ceased, the excess acetone is preferably removed. An alcohol or aqueous alcohol may then be added, and the synthesis completed in one or two stages as already described.

When the conversion of the chloretone into methacrylic acid or an ester thereof is carried out in two stages, the second stage—i. e. the conversion of the α-chlor- or α-hydroxyisobutyric acid or ester—may be carried out in the presence of catalysts other than strong acids and bases. For example the removal of the elements of hydrogen chloride from α-chlorisobutyric acid or esters may be effected with the aid of metal salts or other substances capable of catalysing this type of reaction, in particular aluminium chloride. Similarly dehydration catalysts other than strong acids and dehydrating acids and bases, for instance zinc chloride or alumina, may be used to convert α-hydroxyisobutyric acid or esters into methacrylic acid or esters thereof.

The methacrylic acid and methacrylic esters produced by the new process may be purified in any way and to any degree desired; they may then be used for the manufacture of clear transparent resinous compounds by polymerisation, or for any other purposes.

The following examples illustrate without in any way limiting the invention.

Example 1

100 parts by weight of chloretone is mixed with 130 parts of a concentrated aqueous solution of potassium hydroxide, and 90 parts of methanol added thereto. The mixture is boiled under reflux until the greater part of the chloretone has reacted. The methyl-methacrylate produced can be separated by fractional distillation under reduced pressure.

Example 2

100 parts by weight of chloroform with 1000 parts of acetone is stirred vigorously at room temperature for about ten hours, during which time powdered potassium hydroxide is slowly added at a rate such that by the end of the period the weight of potassium hydroxide present is one tenth that of the chloroform originally used. Unreacted chloroform and acetone are now removed by distillation. 50 parts of ethanol and an equal weight of potassium hydroxide are added, and the mixture heated under reflux for a considerable time. The ethyl-methacrylate formed can be separated by fractionation under reduced pressure.

Example 3

100 parts by weight of chloretone is dissolved in 130 parts of concentrated sulphuric acid, 70 parts methanol is added, and the mixture heated under reflux for a number of hours, until the greater part of the chloretone has been converted into methyl α-chlorisobutyrate. The mixture is now cooled and the sulphuric acid is converted into potassium bisulphate by adding sufficient potassium sulphate. The methyl α-chlorisobutyrate is recovered by distillation, and is heated with a caustic alkali or with quinoline, whereby it is converted into methyl-methacrylate.

Having described our invention, what we desire to secure by Letters Patent is:

1. Process for the manufacture of methacrylic compounds, which comprises treating a mixture of chloretone and an alcohol with a substance selected from the group which consists of strong acids, dehydrating acids, caustic alkalis and organic bases.

2. Process for the manufacture of methacrylic compounds, which comprises treating a mixture of chloretone, an alcohol and water with a substance selected from the group which consists of strong acids, dehydrating acids, caustic alkalis and organic bases.

3. Process for the manufacture of methacrylic compounds, which comprises heating a mixture of one molecular proportion of chloretone and at least two molecular proportions of an alcohol to a temperature above 50° C. in the presence of a substance selected from the group which consists of strong acids, dehydrating acids, caustic alkalis and organic bases.

4. Process for the manufacture of methacrylic compounds, which comprises heating a mixture of one molecular proportion of chloretone, at least two molecular proportions of an alcohol and at least two molecular proportions of water to a temperature above 50° C. in the presence of a substance selected from the group which consists of strong acids, dehydrating acids, caustic alkalis and organic bases.

5. Process for the manufacture of methacrylic compounds, which comprises heating a mixture of one molecular proportion of chloretone and at least two molecular proportions of an alcohol to a temperature above 50° C. in the presence of between one and four molecular proportions of concentrated sulphuric acid.

6. Process for the manufacture of methacrylic compounds, which comprises heating a mixture of one molecular proportion of chloretone and at least two molecular proportions of an alcohol to a temperature above 50° C. in the presence of between one and four molecular proportions of an alkali metal hydroxide.

7. Process for the manufacture of lower alkyl methacrylates, which comprises boiling a mixture of one molecular proportion of chloretone with at least two molecular proportions of a lower fatty alcohol under reflux at about atmospheric pressure in the presence of a substance selected from the group which consists of strong acids, dehydrating acids, caustic alkalis and organic bases.

8. Process for the manufacture of lower alkyl methacrylates, which comprises boiling a mixture of one molecular proportion of chloretone with at least two molecular proportions of a lower fatty alcohol under reflux at about atmospheric pressure in the presence of between one and four molecular proportions of concentrated sulphuric acid.

9. Process for the manufacture of lower alkyl methacrylates, which comprises boiling a mixture of one molecular proportion of chloretone with at least two molecular proportions of a lower fatty alcohol under reflux at about atmospheric pressure in the presence of between one and four molecular proportions of an alkali metal hydroxide.

10. Process for the manufacture of methacrylic compounds, which comprises heating a mixture of one molecular proportion of chloretone and at least two molecular proportions of an alcohol to a temperature above 50° C. in the presence of a substance selected from the group which consists of strong acids, dehydrating acids, caustic alkalis and organic bases, the heating being carried out in two stages, in the first of which a substituted isobutyric ester is formed.

11. Process for the manufacture of lower alkyl methacrylates, which comprises boiling a mixture of one molecular proportion of chloretone with at least two molecular proportions of a lower fatty alcohol under reflux at about atmospheric pressure in the presence of sulphuric acid, and heating the substituted isobutyric ester so produced to a temperature between 50° and 150° C. in the presence of a substance selected from the group which consists of strong acids, dehydrating acids, caustic alkalis and organic bases.

12. Process for the manufacture of lower alkyl methacrylates, which comprises boiling a mixture of one molecular proportion of chloretone with at least two molecular proportions of a lower fatty alcohol under reflux at about atmospheric pressure in the presence of a caustic alkali, and heating the substituted isobutyric ester so produced to a temperature between 50° and 150° C. in the presence of a substance selected from the group which consists of strong acids, dehydrating acids, caustic alkalis and organic bases.

EDWARD BOADEN THOMAS.
HORACE FINNINGLEY OXLEY.